(12) United States Patent
Graf et al.

(10) Patent No.: US 12,678,953 B2
(45) Date of Patent: Jul. 14, 2026

(54) MECHANICAL END STOP DETECTION METHOD

(71) Applicant: ETEL S.A., Motiers (CH)

(72) Inventors: Basile Renaud Graf, Neuchatel (CH); Ralph Coleman, Fleurier (CH)

(73) Assignee: ETEL S.A., Motiers (CH)

( * ) Notice: Subject to any disclaimer, the term of this patent is extended or adjusted under 35 U.S.C. 154(b) by 227 days.

(21) Appl. No.: 18/607,600

(22) Filed: Mar. 18, 2024

(65) Prior Publication Data

US 2024/0316771 A1 Sep. 26, 2024

(30) Foreign Application Priority Data

Mar. 23, 2023 (EP) ..................................... 23163635

(51) Int. Cl.
*B25J 9/16* (2006.01)
*F16F 15/02* (2006.01)

(52) U.S. Cl.
CPC ............. *B25J 9/1664* (2013.01); *F16F 15/02* (2013.01)

(58) Field of Classification Search
CPC ...... B25J 9/1664; F16F 15/002; G05D 19/02; B60N 2/501; G05B 19/401; G05B 2219/49048
USPC ....................................................... 248/550
See application file for complete search history.

(56) References Cited

U.S. PATENT DOCUMENTS

| | | | |
|---|---|---|---|
| 6,021,991 A | 2/2000 | Mayama et al. | |
| 7,656,115 B2 * | 2/2010 | VanderZee ................ | H02P 8/08 |
| | | | 318/116 |
| 12,429,863 B2 * | 9/2025 | Graf ..................... | G01B 11/002 |
| 2010/0161182 A1 | 6/2010 | Contratto et al. | |
| 2017/0130802 A1 | 5/2017 | Lee et al. | |
| 2021/0097440 A1 | 4/2021 | Li et al. | |
| 2024/0017653 A1 * | 1/2024 | Matthew ................ | B60N 2/501 |

FOREIGN PATENT DOCUMENTS

| | | | |
|---|---|---|---|
| WO | WO 2013122258 A1 | 8/2013 | |
| WO | WO 2022109015 A2 | 5/2022 | |

* cited by examiner

*Primary Examiner* — Bradley Duckworth

(74) *Attorney, Agent, or Firm* — LEYDIG, VOIT & MAYER, LTD.

(57) ABSTRACT

A method is provided for detecting a mechanical end stop of a motion system comprising a base designed to receive a motion stage, a machine frame and an active isolation system comprising actuators arranged to impart a six degree-of-freedom (DOF) motion to the base, inertial sensors arranged to provide a six DOF measurement, the mechanical end stop being arranged to limit the base's motion relative to the machine frame. The method includes selecting a translational DOF, and determining, using a process sensitivity matrix of a mechanical system comprising the base and the active isolation system, a force to be applied to the base by the actuators to cause an oscillatory motion of the base in the translational DOF. The method further includes applying the force to obtain the oscillatory motion, and detecting a mechanical contact between the base and the mechanical end stop using the inertial sensors.

17 Claims, 3 Drawing Sheets

MECHANICAL END STOP DETECTION METHOD

CROSS REFERENCE TO RELATED APPLICATIONS

This application claims benefit to European Patent Application No. EP23163635.8, filed on Mar. 23, 2023, which is hereby incorporated by reference herein.

FIELD

The present invention concerns a method for detecting a mechanical end stop of a motion system.

BACKGROUND

Precision motion systems, in particular semiconductor processing equipment such as positioning devices, coordinate measuring machines or robots, comprise so-called active isolation systems, as disclosed in U.S. Pat. No. 6,021,991, for isolating precision motion systems from ground vibration. Active isolation systems typically comprise several active bearings which are assembled between a base onto which the precision motion system can be mounted and a machine frame that rests on the floor. The base can therefore move relatively to the machine frame. Active isolation systems ensure the operation of precision motion systems with as little parasitic movement as possible, as a result of which a high positioning or measurement accuracy is obtained.

During transportation of a motion system, the motion of the base relatively to the machine frame is prevented by means of shipping brackets to avoid the system from being damaged. When released for normal operation, the shipping brackets also provide mechanical end stops to limit the relative motion between the base and the machine frame and protect the mechanical parts of the system.

When a motion system is commissioned, the first step is to adjust the machine frame in such a way that the frame (and base) is perfectly horizontal. Once this operation has been completed, the shipping brackets are released so that the base can move on its dampers. Depending on the stiffness of the dampers and the additional equipment which has been installed on the base, the base does not settle in a horizontal position but remains tilted or stabilizes lower due to extra weight. This can be corrected by turning the height adjustments screws in the dampers in such a way to correct the horizontality and height of the base. Even if the base is horizontal, there is no guarantee that its height corresponds to the middle of its vertical end stops. This can be checked with shims, but this operation is rather imprecise and cumbersome.

Moreover, it is possible that the tilt or height of the base will change over time, for example if the elastomer in the dampers creeps over time, and an automatic measurement of the position of the base with respect to its mechanical end stops is useful as part of a periodic maintenance.

Document WO2013/122258 discloses an active vibration isolator. Controllers are used to correct deviations and to dampen unwanted vibration. The calculated forces and torques commands in the six degrees-of-freedom (DOFs) relative to the gravity point of the base are then transformed into commands for each actuator.

SUMMARY

In an embodiment, the present invention provides a method for detecting a mechanical end stop of a motion system comprising a base designed to receive a motion stage for an equipment, a machine frame resting on a floor and an active isolation system therebetween, wherein the active isolation system comprises a plurality of actuators arranged to impart a six degree-of-freedom (DOF) motion to the base, a plurality of inertial sensors arranged to provide a six DOF measurement of motion of the base, and dampers to support the base, the mechanical end stop being arranged to limit the motion of the base relative to the machine frame. The method includes selecting a translational DOF among the six DOFs, and determining, using a process sensitivity matrix of a mechanical system comprising the base and the active isolation system, a force to be applied to the base by the actuators to cause an oscillatory motion of the base in the selected translational DOF, the oscillatory motion being of a predetermined amplitude. The method further includes applying the force to the base using the actuators to obtain the oscillatory motion of the base in the selected translational DOF, and detecting a mechanical contact between the base and the mechanical end stop using at least one of the inertial sensors.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
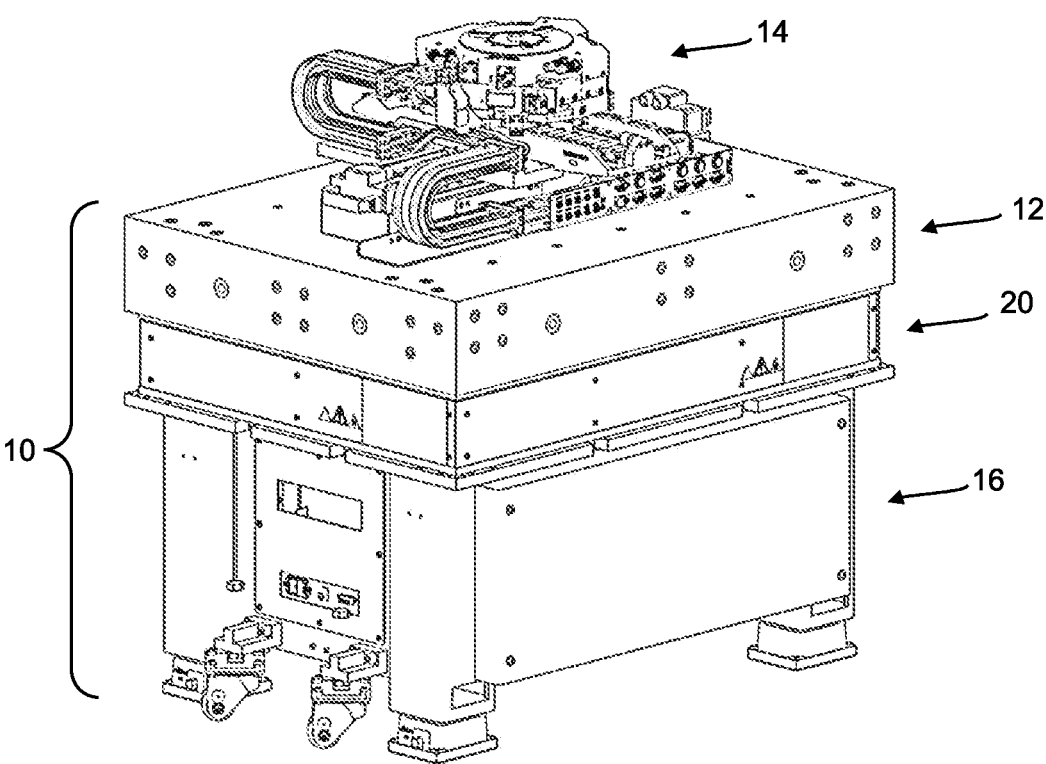
FIG. 1 shows a perspective view of a motion system comprising a granite base onto which is mounted a motion stage, a machine frame resting on the floor and an active isolation system therebetween.

Embodiments of the present invention recognize it is advantageous to be able to determine the free stroke of the base in each of its translational DOFs and to be able to locate the position of the base relative to each mechanical end stop.

In an embodiment, the present invention provides a method for detecting a mechanical end stop of a motion system that overcomes the shortcomings and limitations of the state of the art.

In an embodiment, the present invention provides a method for detecting a mechanical end stop of a motion system which prevents the motion system from being damaged due to collisions with a mechanical end stop.

In an embodiment, the present invention provides a method for detecting a mechanical end stop of a motion system allowing to locate the motion system relatively to the mechanical end stop.

According to an embodiment of the invention, a method for detecting a mechanical end stop of a motion system that overcomes the shortcomings and limitations of the state of the art, which prevents the motion system from being damaged due to collisions with a mechanical end stop and/or allows to locate the motion system relative to the mechanical end stop is provided for by a method for detecting a mechanical end stop of a motion system comprising a base designed to receive a motion stage for an equipment, a machine frame resting on the floor and an active isolation system therebetween, wherein said active isolation system comprises several actuators arranged to impart a six degree-of-freedom (DOF) motion to said base, several inertial sensors arranged to provide a six DOF measurement of the base's motion, and dampers to support the base, the mechanical end stop being arranged to limit the base's motion relative to the machine frame, the method comprising the steps of:

(a) selecting a translational DOF among the six DOFs;

(b) determining, using the process sensitivity matrix of the mechanical system comprising the base and the active isolation system, a force to be applied to the base by the actuators to cause an oscillatory motion of the base in the selected translational DOF the motion being of a predetermined amplitude;

(c) applying the force to the base using the actuators to obtain the oscillatory motion of the base in the selected translational DOF;

(d) detecting a mechanical contact between the base and the mechanical end stop using at least one inertial sensor from the several inertial sensors.

The motion system may comprise one mechanical end stop associated to each translational DOF, and the method steps (a)-(d) can be repeated for each other translational DOF among the six DOFs so that a detection of mechanical end stop is performed in each direction.

The process sensitivity matrix can be represented as a 6×6 matrix with complex entries corresponding to the amplitude and phase of the displacement in each given DOF relatively to a component of a disturbance force applied to the base, in each given DOF.

The step (c) may further comprises determining the force to be applied to the base by multiplying a vector representing a motion with the predetermined amplitude in the selected translational DOF by the matrix inverse of the process sensitivity matrix.

The process sensitivity matrix can be obtained by applying a disturbance force to the base in each DOF and measuring the amplitude and phase of the base's motion in each DOF using the inertial sensors to populate the columns of the process sensitivity matrix.

The disturbance force ($F_{ext}$) can be a sinusoidal force. This induces an oscillation motion of the base along the selected DOF.

The disturbance force can be a sum of multiple sinusoidal functions at different frequencies. This allows for example the input of a single superposed signal causing the base to oscillate along several DOFs.

The disturbance force typically comprises one or more frequencies in the range between 0.5 Hz and 10 Hz.

Step (b) of the detection method can further comprise:

determining an offset force required to create a position offset along the translational DOF, the position offset being selected in such a way that the sum of position offset and oscillation amplitude is larger than a mechanical end stop nominal gap, and;

Step (c) can further comprise:

progressively applying the offset force to the base using a first ramp over several periods of an oscillation of the base so that the base's motion is a combination of the oscillatory motion and of an offset motion caused by the offset force.

This offset position of the base allows to keep the oscillations of the base at a low energy level to further prevent damages to the motion system.

The detection method can further comprise a step of:

once a first mechanical contact between the base and a first mechanical end stop, the first mechanical stop being the mechanical end stop, has been detected, applying the offset force using a second ramp having a slope opposite to a slope of the first ramp, detecting a second mechanical contact between the base and a second mechanical end stop that is opposed to the first mechanical end stop along the translational DOF.

The offset force may have the following vectorial form:

$$F_{off} = \Re(PS^{-1} \cdot x),$$

where $\Re$ denotes the real part of a complex number, $PS^{-1}$ is the matrix inverse of the process sensitivity matrix and x is a vector representing an offset amplitude in the translational DOF.

The offset force may have the following vectorial form:

$$F_{off} = \lambda k,$$

where $\lambda$ an offset amplitude and k is a vector representing the stiffness of the dampers in the selected DOF.

The offset force may have the following vectorial form:

$$F_{off} = \Gamma \cdot x$$

where x is a vector representing an offset amplitude in the translational DOF and $\Gamma$ is a rigidity matrix associated to the dampers and their coordinates.

The method may further comprise a step of:

acquiring a position of the base when a contact with the mechanical end stop is detected.

The method may further comprise a step of:

computing a relative position of the base respectively to the mechanical end stop when the base is at rest based on the acquired position of the base when a contact with the mechanical end stop is detected.

This allows a user to determine if the position of the base at rest needs to be adjusted, for example if the rest position is too close to a mechanical end stop.

The method may further comprise a step of providing a visual indication of the relative position.

The visual indication may further indicate if a damper of the motion system has to be adjusted based on the relative position.

An embodiment of the present invention relates to a method for detecting mechanical end stops of a motion system 10. As illustrated in FIG. 1, a motion system 10 comprises a base 12, typically a granite base, designed to receive a motion stage 14 for an equipment, a machine frame 16 resting on the floor and an active isolation system 20 therebetween. The role of the active isolation system 20 is to isolate the motion stage from external vibrations which would cause the base supporting the motion stage to move in an unwanted manner.

This method is typically at least partially computer implemented, though some steps may require a user to interact with either the motion system or the computer.

The active isolation system 20 hence comprises several actuators $M_{X1}$, $M_{X2}$, $M_{Y1}$, $M_{Y2}$, $M_{Z1}$, $M_{Z2}$, $M_{Z3}$, $M_{Z4}$ arranged to impart a six degree-of-freedom (DOF) motion to the base 12. It also comprises several inertial sensors $S_{X1}$, $S_{Y1}$, $S_{Y2}$, $S_{Z1}$, $S_{Z2}$, $S_{Z3}$ arranged to provide a six DOF measurement of the base's motion as well as dampers to support the base.

It is to be noted that throughout the present specification, the six DOFs of the base are identified with given references. The three translational DOFs are identified with the coordinates X, Y, Z corresponding to the coordinates system that they define, while the other three rotational DOFs are identified with the references $R_X$, $R_Y$, $R_Z$ that correspond to rotations around the X, Y, Z coordinate axes.

Figure 2:
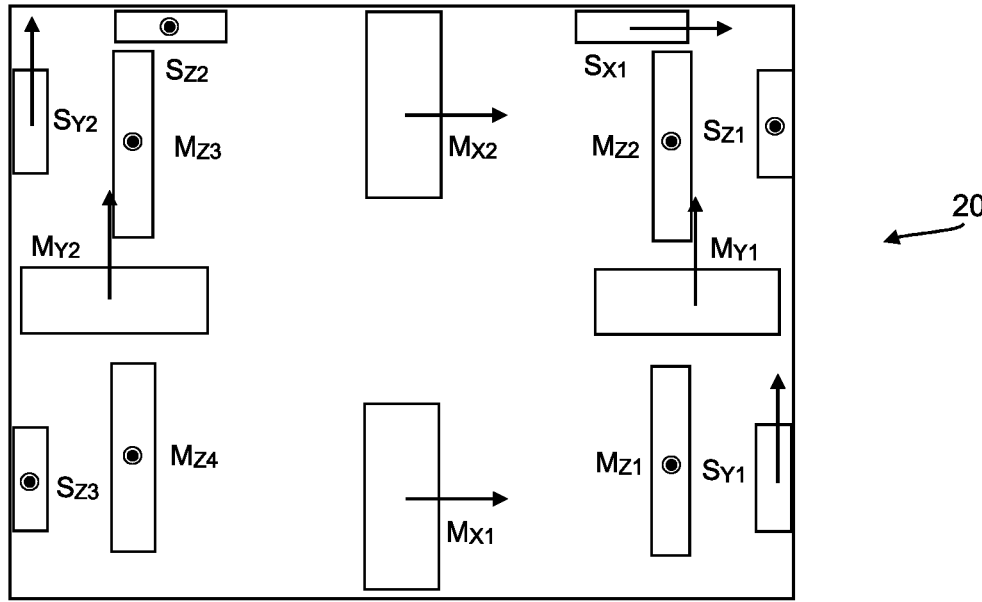
FIG. 2 is a schematic view of the actuator and inertial sensor of active isolation system of FIG. 1 configured to provide a six degree-of-freedom (DOF) actuation to the granite base of the motion system.

While the minimal number of linear actuators required for providing a six DOF motion to the base 12 is equal to six, the isolation system 20 typically comprises more than six actuators. As illustrated in FIG. 2, the isolation system may comprise eight actuators $M_{X1}$, $M_{X2}$, $M_{Y1}$, $M_{Y2}$, $M_{Z1}$, $M_{Z2}$, $M_{Z3}$, $M_{Z4}$, with the first two applying forces in the direction X, the third and fourth applying forces in the direction Y, and the remaining four applying forces in the vertical direction Z. The first four actuators can be used to actuate the in-plane DOFs X, Y, $R_Z$ and the remaining four to actuate the out-of-plane DOFs Z, $R_X$, $R_Y$.

Similarly, the minimal number of sensors required to measure the base's motion in the six DOFs is equal to six, and the isolation system typically comprises at least six inertial sensors $S_{X1}$, $S_{Y1}$, $S_{Y2}$, $S_{Z1}$, $S_{Z2}$, $S_{Z3}$ as illustrated in FIG. 2. The first sensor measures motions in the X direction, the second and third sensors measure motions in the Y direction and the remaining three measure motions in the vertical Z direction. The first three sensors are typically used to measure the in-plane DOFs X, Y, $R_Z$ and the remaining three measure the out-of-plane DOFs Z, $R_X$, $R_Y$. Other combinations of sensors are also possible while maintaining the possibility to measure all DOFs.

To limit or prevent certain types of motion of the base 12 relatively to the machine frame 16 that could damage parts of the motion system, the motion system is usually equipped with mechanical end stops. Shipping brackets are typically used during transportation when the whole system is subject to external motion and may undergo damages due to an uncontrolled motion of the base relative to the machine frame. It is important to prevent relative displacement of high amplitude to avoid damages. When released for normal operation, the shipping brackets also provide mechanical end stops, that are used when the motion system 10 is in operation mode, to limit the motion of the base in the different DOFs. For example, motion can be limited to ±1 mm in X, Y and Z directions to protect all other mechanical parts.

The method for detecting a mechanical end stop comprises a first basic step which is to select a translational DOF. In other words, it corresponds to selecting either X, Y or Z according to which direction the relevant mechanical end stop is associated.

This selection can be made by a user or directly by means of a computer. In an embodiment, a user is asked by a computer program allowing the execution of the method according to an embodiment of the present invention to explicitly select a translational DOF. In another embodiment, the method is part of a calibration process of the motion system and a computer executing the method according to an embodiment of the present invention will automatically select a translational DOF to proceed with the further steps.

During the second step of the method, a force F, to be applied by the actuators, and causing the base 12 to oscillate along the selected translational DOF is determined. This oscillatory motion is of a pre-determined amplitude. This pre-determined amplitude may have been provided by a user to the computer executing the method and/or by means of a computer program, e.g. based on a simulation or virtual model of the motion system.

This allows to look for contact between the base and the mechanical end stop with low energy, preventing damages to the motion system. The pre-determined amplitude is typically chosen so as to prevent any harmful impact between parts of the motion system, based on its particular geometry and physical characteristics.

To measure the location of the mechanical end stop of the system, it is desirable to perform a "pure" motion along each of the selected translational DOFs, i.e. a motion whose components in the other DOFs are inexistent or negligible. Indeed, any parasitic motions in other DOFs (particularly rotations) will disturb the measurement and make the admissible motion range in the translational DOFs appear smaller than it actually is.

The force F is determined using the process sensitivity matrix PS of the mechanical system comprising the base 12 and the active isolation system 20.

The process sensitivity matrix of a mechanical system is well known in the art. In the context of this disclosure, the process sensitivity matrix PS of the mechanical system comprising the base 12 and the active isolation system is a matrix providing the amplitudes of movements of the base 12 relative to the machine frame 16 in all DOFs when a disturbance force $F_{ext}$ is applied to the base.

In one embodiment, the process sensitivity matrix PS is measured by the inertial sensors $S_{X1}$, $S_{Y1}$, $S_{Y2}$, $S_{Z1}$, $S_{Z2}$, $S_{Z3}$ of the isolation system after the disturbance force $F_{ext}$ has been applied to the base 12 by means of the actuators $M_{X1}$, $M_{X2}$, $M_{Y1}$, $M_{Y2}$, $M_{Z1}$, $M_{Z2}$, $M_{Z3}$, $M_{Z4}$.

More specifically, disturbance force $F_{ext}$ can be decomposed into its components in each DOF as control signals $Fs_x$, $Fs_y$, $Fs_z$, $Fs_{Rx}$, $Fs_{Ry}$, $Fs_{Rz}$. These control signals are applied as disturbance on each DOF to actuate or contribute to the actuation of the corresponding actuators $M_{X1}$, $M_{X2}$, $M_{Y1}$, $M_{Y2}$, $M_{Z1}$, $M_{Z2}$, $M_{Z3}$, $M_{Z4}$ to induce movement of the base 12. Then, the corresponding inertial sensors $S_{X1}$, $S_{Y1}$, $S_{Y2}$, $S_{Z1}$, $S_{Z2}$, $S_{Z3}$ measure the motion of the base 12 in each of the six DOFs.

Figure 3:
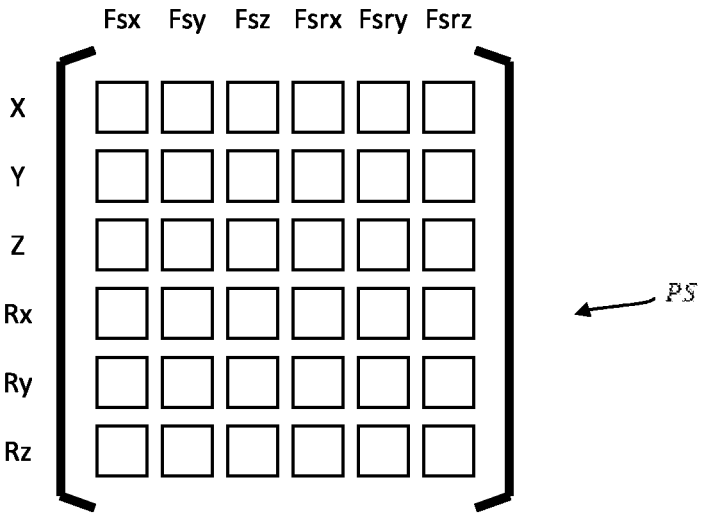
FIG. 3 illustrates a 6×6 complex matrix for in-plane DOFs X, Y, Rz and out-of-plane DOFs Z, Rx, Ry, wherein each column and row correspond to the input and output of a given DOF.

As illustrated in FIG. 3, each column of the process sensitivity matrix corresponds to the motion of the base in each of the DOFs for a given control signal. For example, the first column of the process sensitivity matrix corresponds to the displacements in the X, Y, Z, $R_X$, $R_Y$ and $R_Z$ DOFs consecutively to a control signal $Fs_x$. The second column corresponds to the displacements consecutively to the control signal $Fs_y$, etc.

In an embodiment, the disturbance force $F_{ext}$ is a sinusoidal force. In this case, the control signals are sinewaves and the process sensitivity matrix PS can be represented as a 6×6 matrix with complex entries, each complex entry encoding the amplitude and the phase of the corresponding displacement.

The control signals $Fs_x$, $Fs_y$, $Fs_z$, $Fs_{Rx}$, $Fs_{Ry}$, $Fs_R z$ can be applied sequentially as disturbance on each DOF to actuate or contribute to the actuation of the corresponding actuators $M_{X1}$, $M_{X2}$, $M_{Y1}$, $M_{Y2}$, $M_{Z1}$, $M_{Z2}$, $M_{Z3}$, $M_{Z4}$. The inertial sensors $S_{X1}$, $S_{Y1}$, $S_{Y2}$, $S_{Z1}$, $S_{Z2}$, $S_{Z3}$ can then sequentially measure the base's motion for each control signal.

Alternatively, control signals $Fs_x$, $Fs_y$, $Fs_z$, $Fs_{Rx}$, $Fs_{Ry}$, $Fs_{Rz}$ of different frequencies can be applied simultaneously as disturbance on each DOF for actuating or contributing to the actuation of the corresponding actuators $M_{X1}$, $M_{X2}$, $M_{Y1}$, $M_{Y2}$, $M_{Z1}$, $M_{Z2}$, $M_{Z3}$, $M_{Z4}$. They can also each comprise several frequencies. The inertial sensors $S_{X1}$, $S_{Y1}$, $S_{Y2}$, $S_{Z1}$, $S_{Z2}$, $S_{Z3}$ can then measure the base's motion so as to create the process sensitivity matrix PS. In this case, the disturbance force $F_{ext}$ is a sum of sinusoidal forces with different frequencies for each DOF. This allows to discriminate the displacement of the base in each DOF since all control signals are applied simultaneously.

In the cases in which the disturbance force $F_{ext}$ is a sinusoidal force or a sum of sinusoidal forces, the frequencies of the sinusoids are typically comprised between 0.5 Hz and 10 Hz.

In another embodiment, the process sensitivity matrix PS is determined based on a simulation and/or mathematical modelling of the mechanical system. The resulting process sensitivity matrix can also be a 6×6 matrix with complex entries representing the amplitudes and phases of the displacement in each DOF that have been computed through simulation and/or mathematical modelling.

The force F is determined so that the resulting motion when the force is applied to the base is a pure motion along the selected DOF and so that the amplitude of the resulting motion is equal to the pre-determined amplitude.

In a coordinates system determined by the six DOFs, that is in the (X, Y, Z, $R_X$, $R_Y$, $R_Z$)-coordinate system, the force F required to obtain a pure motion along the first translational DOF corresponding to X can be obtained by multiplying a vector of the form x=$(A,0,0,0,0,0)^T$, where A is the pre-determined amplitude of the desired motion, with the inverse of the process sensitivity matrix:

$$F = PS^{-1} \cdot x.$$

Similarly, pure motions along Y or Z with pre-determined amplitude A can be obtained by multiplying vectors of the form y=$(0,A,0,0,0,0)^T$, respectively z=$(0,0,A,0,0,0)^T$. The force F is therefore a complex vector yielding the amplitude and phase of the sinusoidal forces to be applied in each DOF to obtain the pure motion of the base at the frequency for which the process sensitivity matrix was obtained.

It is to be noted that a mechanical system in which all actuators and sensors are working as planned will yield a process sensitivity matrix of maximal rank, meaning that it admits an inverse matrix $PS^{-1}$. Therefore, the above equation is well-defined.

During the third step of the method, the sinusoidal forces derived from force F computed during the second step are applied to the base 12 using the actuators $M_{X1}$, $M_{X2}$, $M_{Y1}$, $M_{Y2}$, $M_{Z1}$, $M_{Z2}$, $M_{Z3}$, $M_{Z4}$. As a result, the base 12 oscillates along the selected DOF, the oscillations having the pre-determined amplitude.

The fourth step of the method is the detection of the mechanical end stop consecutive to a contact between the base 12 and the mechanical end stop associated to the selected DOF. The detection of the contact is made using at least one inertial sensor among all the inertial sensors $S_{X1}$, $S_{Y1}$, $S_{Y2}$, $S_{Z1}$, $S_{Z2}$, $S_{Z3}$.

Although a contact can be detected using only one inertial sensors, it is likely that each inertial sensor will measure the contact between the base and the mechanical end stop will induce residual motion in several DOFs.

Figure 4:
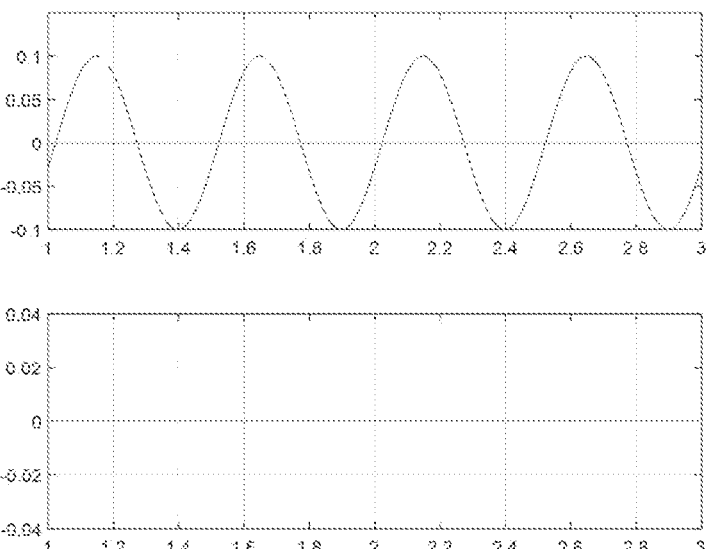
FIG. 4 illustrates the measurements of the base as a function of time in the X DOF consecutively to the input of a force corresponding to a 0.1 mm displacement; the upper chart shows the position in the X, Y and Z DOFs, while the bottom chart shows the position in the Rx, Ry and Rz DOFs.

The two charts shown in FIG. 4 illustrates a pure motion of the base 12 along a translational DOF corresponding to X of an amplitude equal to 0.1 mm and on a time interval of 2s. On the upper chart, the x-axis shows the time in seconds and the y-axis shows the position of the base with respect to a reference position in millimeters. The plain line corresponding to the equation y=0 corresponds to the base's motion along the two other translational DOFs Y and Z. On the lower chart, motions along the three rotational DOFs corresponding to $R_X$, $R_Y$, $R_Z$ of the base are shown. The x-axis shows the time in seconds while the y-axis shows the position of the base relative to $R_X$, $R_Y$, $R_Z$ in mrad (milliradians). Since the motion is pure along X, all motion components along $R_X$, $R_Y$, $R_Z$ are equal to zero.

In order to further prevent collisions of the base 12 with the mechanical end stop at dangerous speed, the oscillation motion of the base can be combined with a ramp signal to progressively create an offset of the base 12 with respect to its rest position. Therefore, the amplitude of the oscillation does not need to be increased for the base 12 to impact the mechanical end stop since the offset position of the base will naturally bring the base closer to the mechanical end stop. This allows to create a contact between the base and the mechanical end stop at low energy level since the amplitude of the oscillation can be kept small and therefore to prevent damages.

More specifically, the second step of the method can further include the determination of an offset force $F_{off}$ that is required to create a position offset along the selected translational DOF. When applied to the base 12 by means of the actuators $M_{X1}$, $M_{X2}$, $M_{Y1}$, $M_{Y2}$, $M_{Z1}$, $M_{Z2}$, $M_{Z3}$, $M_{Z4}$, the offset force $F_{off}$ will cause the base 12 to move along the selected translational DOF to get closer to the mechanical end stop while oscillating. The ramp signal corresponding to the offset force $F_{off}$ is typically applied over several oscillations of the base 12.

Figure 5:
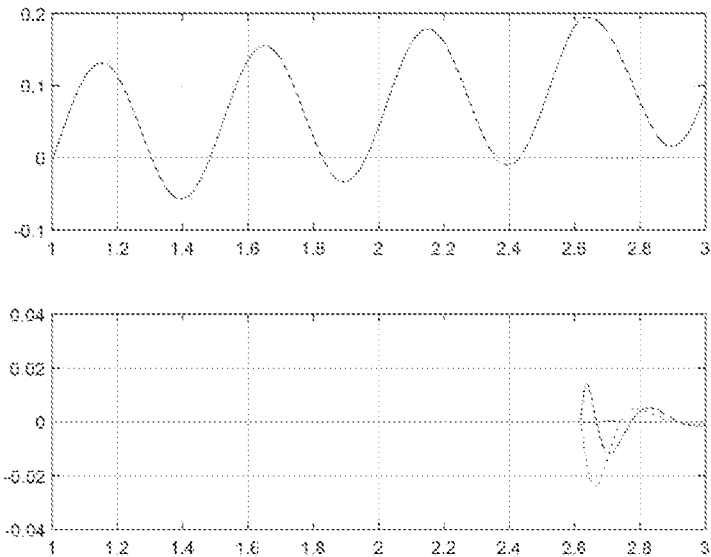
FIG. 5 illustrates the position of the base as a function of time in the X DOF with the addition of an offset. The upper chart shows the position in the X, Y and Z DOFs, while the bottom chart shows the position in the Rx, Ry and Rz DOFs.

As illustrated in the upper chart of FIG. 5, a ramp signal corresponding to an offset force $F_{off}$ is applied to the base 12 and the offset position of the base 12 gradually increases over several oscillations along the selected DOF. The x-axis corresponds to time measured in seconds and the y-axis corresponds to the position of the base 12 along the three translational DOFs measured in mm (millimeters). Since the motion of the base 12 is pure along the selected DOF, the measured motion along the two other translational DOFs are equal to zero.

The contact between the base 12 and the mechanical end stop induces residual rotations that can be detected. FIG. 5 illustrates the positions (measured in milliradians) of the base along the rotational DOFs corresponding to $R_X$, $R_Y$, $R_Z$ as functions of time. A contact between the base 12 and a mechanical end stop is detected by observing the variation of the position of the base along $R_X$, $R_Y$, $R_Z$, when the position along the selected DOF reaches 0.19 mm. A small distortion of the sinewave signal of the upper chart of FIG. 5 is also detected.

Usually, the movement of the base 12 along a given translational DOF has to be prevented in both directions to avoid damages. This can be done for example by means of a bi-directional mechanical end stop and/or by means of several mechanical end stops disposed at opposites sides of the base along the selected translational DOF. Any other suitable type of mechanical end stop can be equally used by the person skilled in the art.

In an embodiment, a ramp signal corresponding to an offset force $F_{off}$ is applied to the base 12 in a first direction until a contact between the base and a first mechanical end stop is detected. Then, the slope of the ramp signal is reversed and applied to the base 12 so that the base 12 moves in a second direction opposed to the first direction with the same offset force amplitude, until a contact between the base 12 and a second mechanical end stop is detected.

In the case of a bi-directional mechanical end stop, the first and second mechanical end stops can be the same mechanical end stop.

In one embodiment, the offset force $F_{off}$ is determined using the process sensitivity matrix associated to the mechanical system discussed above. More specifically, the offset force can take the following vectorial form:

$$F_{off} = \Re(PS^{-1} \cdot x),$$

where $\Re$ denotes the real part of a complex number, $PS^{-1}$ is the matrix inverse of the process sensitivity matrix (PS) and x is a vector representing an offset amplitude in the selected translational DOF. For example, the offset force $F_{off}$ required to obtain a desired offset amplitude of the base 12 equal to =0.5 mm in the translational DOF corresponding to the coordinate X can be obtained by setting $x=(\lambda,0,0,0,0,0)^T$ in the equation above.

In another embodiment, the offset force $F_{off}$ is determined using the stiffness the dampers. Indeed, for some systems, it is possible to neglect the cross-coupling and estimate the offset force only using the stiffness of the dampers. Denoting by $\lambda$ the desired offset amplitude, the offset force can take the following vectorial form:

$$F_{off} = \lambda k,$$

where k is a vector representing the stiffness of the dampers in the selected DOF. For example, the offset force $F_{off}$ required to obtain an offset position of the base 12 equal to $\lambda=0.5$ mm in the translational DOF corresponding to the coordinate X can be obtained by taking $k=(k_X,0,0,0,0,0)^T$, where $k_X$ is the stiffness of the dampers in the X direction measured in N/m.

In another embodiment, the offset force $F_{off}$ is determined using the rigidity matrix F associated to the dampers. This 6×6 matrix relates the offset force $F_{off}$ to the displacements in the six DOFs by the following equation:

$$F_{off} = \Gamma \cdot x,$$

and can be calculated knowing the stiffness of the dampers and their coordinates. For example, the offset force $F_{off}$ required to obtain a desired offset amplitude of the base 12 equal to X=0.5 mm in the translational DOF corresponding to the coordinate X can be obtained by setting $x=(\lambda,0,0,0,0,0)^T$ in the equation above.

Although the detection of the contact between the base 12 and the mechanical end stop can be realized using position signals of the base, the speed signals provided by the inertial sensors can also be used. Conventional signal processing such as signal-to-noise ratio (SNR) or total harmonic distortion (THD) can be used to determine distortion in the position or speed signals. Alternatively or complementarily, a monitoring of the rotation speed of the base allowing detection of sudden changes based on a detection threshold can also be used to detect contact.

In order to allow the location of the base 12 relative to the mechanical end stop(s), a step of acquiring the position of the base when a contact with the mechanical end stop is detected can be further executed.

In an embodiment in which a ramp signal is applied to create an offset position of the base 12, the acquisition of the base's position can be realized by storing the ramp value at which the contact between the base 12 and the mechanical end stop is detected. This step can be executed in each direction and for each translational DOF.

Alternatively or complementarily, one or more inertial sensors $S_{X1}$, $S_{Y1}$, $S_{Y2}$, $S_{Z1}$, $S_{Z2}$, $S_{Z3}$ may be used for acquiring the position of the base 12 when a contact with a mechanical end stop is detected.

Using the stored ramp values, the position of the base 12 relatively to the mechanical end stop when the base is at rest, i.e. when no force is applied on the base through the actuators, can then be computed in a further step. This step can be executed in real-time or alternatively, the stored acquired position can be used at a later stage to calibrate or adjust the motion system.

In an embodiment, the step of computing the relative position of the base 12 can further include the provision of a visual indication of relative position to a user. Such a visual indication can be useful for a user to quickly get the information of how much free end stroke is available in each translational DOF.

Additionally to the relative position of the base 12, the visual indication may also display indications on whether or which of one or more dampers need to be adjusted in order to bring the base closer or further from a mechanical end stop.

Figure 6:
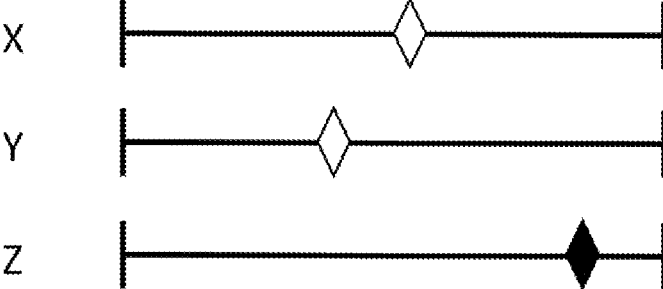
FIG. 6 illustrates a visual indication that can be provided to a user to show the relative position of the table with respect to mechanical end stops in the X, Y and Z DOFs.

As illustrated in FIG. 6, the visual indication can indicate the relative position of the base 12 in each of the DOFs represented by X, Y, Z. Each one of the horizontal lines represented the available free stroke along one translational DOF. The diamonds on the lines indicate the relative position of the base along the particular DOF. A further indication is provided by the filling color of each diamond. White diamonds indicate that no adjustment on the dampers corresponding to the particular DOF is needed while the black diamond indicates that the corresponding dampers shall be adjusted in order to bring the base closer to the middle of the available free stroke along the Z DOF.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

10 Motion system
12 Base
14 Motion stage
16 Machine frame
Active isolation system
$M_{X1}$, $M_{X2}$, $M_{Y1}$, $M_{Y2}$, $M_{Z1}$, $M_{Z2}$, $M_{Z3}$, $M_{Z4}$ Actuators
$S_{X1}$, $S_{Y1}$, $S_{Y2}$, $S_{Z1}$, $S_{Z2}$, $S_{Z3}$ Inertial sensors
PS Process sensitivity matrix
F Force
$F_{ext}$ Disturbance force
$F_{off}$ Offset force
X, Y, Z Translational DOFs
$R_X$, $R_Y$, $R_Z$ Rotational DOFs

What is claimed is:

1. A method for detecting a mechanical end stop of a motion system comprising a base designed to receive a motion stage for an equipment, a machine frame resting on a floor and an active isolation system therebetween, wherein the active isolation system comprises a plurality of actuators arranged to impart a six degree-of-freedom (DOF) motion to the base, a plurality of inertial sensors arranged to provide a six DOF measurement of motion of the base, and dampers to support the base, the mechanical end stop being arranged to limit the motion of the base relative to the machine frame, the method comprising:

(a) selecting a translational DOF among the six DOFs;

(b) determining, using a process sensitivity matrix of a mechanical system comprising the base and the active isolation system, a force to be applied to the base by the actuators to cause an oscillatory motion of the base in the selected translational DOF, the oscillatory motion being of a predetermined amplitude;

(c) applying the force to the base using the actuators to obtain the oscillatory motion of the base in the selected translational DOF;

(d) detecting a mechanical contact between the base and the mechanical end stop using at least one of the inertial sensors.

2. The method according to claim 1, wherein the motion system comprises one mechanical end stop associated to each translational DOF, and wherein the steps (a)-(d) are repeated for each other translational DOF among the six DOFs.

3. The method according to claim 1, wherein the process sensitivity matrix is a 6×6 matrix with complex entries corresponding to amplitude and phase of displacement in each given DOF relative to a component of a disturbance force applied to the base, in each given DOF.

4. The method according to claim 3, wherein step (c) further comprises determining the force to be applied to the base by multiplying a vector representing a motion with the predetermined amplitude in the selected translational DOF by a matrix inverse of the process sensitivity matrix.

5. The method according to claim 3, wherein the process sensitivity matrix is obtained by applying a disturbance force to the base in each DOF and measuring amplitude and phase of the motion of the base in each DOF using the inertial sensors to populate columns of the process sensitivity matrix.

6. The method according to claim 5, wherein the disturbance force is a sinusoidal force.

7. The method according to claim 5, wherein the disturbance force is a sum of a plurality of sinusoidal functions at different frequencies.

8. The method according to claim 6, wherein the disturbance force comprises one or more frequencies in a range between 0.5 Hz and 10 Hz.

9. The method according to claim 1, wherein:

step (b) further comprises: determining an offset force required to create a position offset along the translational DOF, the position offset being selected in such a way that a sum of the position offset and the amplitude of the oscillatory motion is larger than a mechanical end stop nominal gap, and;

step (c) further comprises: progressively applying the offset force to the base using a first ramp over several periods of an oscillation of the base so that the motion of the base is a combination of the oscillatory motion and of an offset motion caused by the offset force.

10. The method according to claim 9, further comprising: once a first mechanical contact between the base and the mechanical end stop has been detected, applying the offset force using a second ramp having a slope opposite to a slope of the first ramp, and detecting a second mechanical contact between the base and a further mechanical end stop that is opposed to the mechanical end stop along the translational DOF.

11. The method according to claim 9, wherein the offset force has the following vectorial form:

$$F_{off} = \Re\left(PS^{-1} \cdot x\right)$$

where $\Re$ denotes the real part of a complex number, $PS^{-1}$ is the matrix inverse of the process sensitivity matrix and x is a vector representing an offset amplitude in the translational DOF.

12. The method according to claim 9, wherein the offset force has the following vectorial form:

$$F_{off} = \lambda k$$

where $\lambda$ an offset amplitude and k is a vector representing stiffness of the dampers in the selected DOF.

13. The method according to claim 9, wherein the offset force has the following vectorial form:

$$F_{off} = \Gamma \cdot x$$

where x is a vector representing an offset amplitude in the translational DOF and $\Gamma$ is a rigidity matrix associated to the dampers and coordinates of the dampers.

14. The method according to claim 1, further comprising:

acquiring a position of the base when a contact with the mechanical end stop is detected.

15. The method according to claim 14, further comprising:

computing a relative position of the base respectively to the mechanical end stop when the base is at rest based on the acquired position of the base when a contact with the mechanical end stop is detected.

16. The method according to claim 15, further comprising providing a visual indication of the relative position.

17. The method according to claim 16, wherein the visual indication further indicates whether one of the dampers of the motion system has to be adjusted based on the relative position.

\* \* \* \* \*